United States Patent [19]
Nyssen

[11] 3,915,170  
[45] Oct. 28, 1975

[54] METHOD FOR MENDING QUARTERCRACKS IN HORSES HOOVES

[76] Inventor: Joseph Nyssen, 1734 Anacapa, Santa Barbara, Calif. 93101

[22] Filed: Aug. 15, 1974

[21] Appl. No.: 497,744

[52] U.S. Cl. ..................... 128/336; 54/82; 168/18
[51] Int. Cl.² ................... A01L 15/00; A61D 7/00
[58] Field of Search ............ 128/336; 54/82; 168/18

[56] References Cited
UNITED STATES PATENTS

| | | | |
|---|---|---|---|
| 376,441 | 1/1888 | Hughes | 128/336 |
| 408,080 | 7/1889 | Carroll | 128/336 |
| 652,796 | 7/1900 | Mackey | 128/336 |
| 3,118,449 | 1/1964 | Bane | 128/336 |
| 3,732,929 | 5/1973 | Glass | 54/82 |

Primary Examiner—Aldrich F. Medbery
Attorney, Agent, or Firm—Ernest L. Brown

[57] ABSTRACT

A means and method for mending quartercracks in horse's hooves wherein approximately a semi-circular segment is cut out of the horse's hoof commencing and ending at the quartercrack and rearward of the quartercrack, said segment being cut to the depth of the underlying tissue of the foot; at least a pair of self-tapping screws (preferably) are inserted into the hoof on opposite sides of the quartercrack and adjacent the cut-out segment, such screws being anchors for a tension member such as a string which is then tightened between the anchors to hold the two parts of the hoof together while it mends itself. The underlying tissue of the hoof grows outward into the hole which is cut out, and the living tissue mechanically engages the outer hoof to lock in the quartercrack.

7 Claims, 5 Drawing Figures

METHOD FOR MENDING QUARTERCRACKS IN HORSES HOOVES

BACKGROUND OF THE INVENTION

It is not an infrequent occasion that a horse injures its hoof and a quartercrack is produced. In valuable horses such as race horses, quarter horses and harness horses, a quartercrack substantially puts them out of service until the entire hoof regrows.

A horse's hoof varies in thickness from zero thickness at the hairline to its maximum thickness at the bottom. In high speed horses significant pounding of the foot and hoof occurs. When the hoof strikes, the hoof spreads. The spreading and contracting foot places cyclic stress on the horse's hoof which frequently causes the rear quarter to crack away from the remaining hoof and to become movable relative to the rest of the hoof. A crack, called a quartercrack, appears in the hoof surface. The external crack, however, is only an indication of the more serious break between the rear quarter and the rest of the hoof. The foot becomes painful, bleeds, and the crack spreads.

Prior to this invention, veterinarians and others who service horses frequently resorted to a "McBean" patch wherein the quartercrack was cut out, and the resulting hole was filled with layers of synthetic material after the fashion of a dentist's tooth filling.

BRIEF DESCRIPTION OF THE INVENTION

The means and method of this invention is briefly described as a technique for reinforcing the hoof by attaching the two portions of the hoof with a permanent tension member.

The portion of the hoof rearward of the quartercrack is pierced, as by cutting with a knife, in the shape substantially of a semi-circle or oval. The cut-out segment commences and ends at the quartercrack. The edge is beveled to slope from the surface of the hoof to the bottom of the semi-circular hole. The bottom of the hole reaches the quick of the foot, i.e. the portion having feeling, blood and nerves. The quarter is then found to be loose from the remaining foot, and the quartercrack is found as a thin line around the bottom of the hole representing a layer separation of the quarter from the foot. The quick grows into this portion of the quartercrack, locking the quartercrack.

At least one and preferably two or more anchors are positioned on each side of the quartercrack, bridging the quartercrack. In a preferred embodiment, two screws are screwed into the hoof on the forward side of the quartercrack and two screws are screwed into the hoof on the rearward side of the quartercrack. A tension member is connected between the upper two screws and a second tension member is connected between the lower two screws. If there are additional screws, in pairs, additional tension members are connected between them. The tension member may be a piece of strong line such as fishing line. The line is wrapped around the two screws, is drawn tight and securely fastened to hold the two pieces of the hoof together. In a most preferred embodiment, the line is looped around both screws of a pair of screws so that two strand bundles extend between the two screws. The end of the line is then half hitched between the screws around the two bundles, drawing the bundles together and increasing the tension between the two screws and the two parts of the hoof.

It is therefore an object of this invention to provide a method for treating quartercracks in horse's and other similar animal's hooves.

It is also an object of this invention to provide a method for reinforcing and immobilizing quartercracks in hooves.

BRIEF DESCRIPTION OF THE DRAWINGS

Other objects will become apparent from the following description, taken in connection with the accompanying drawings, in which.

DETAILED DESCRIPTION OF THE INVENTION

Figure 1:
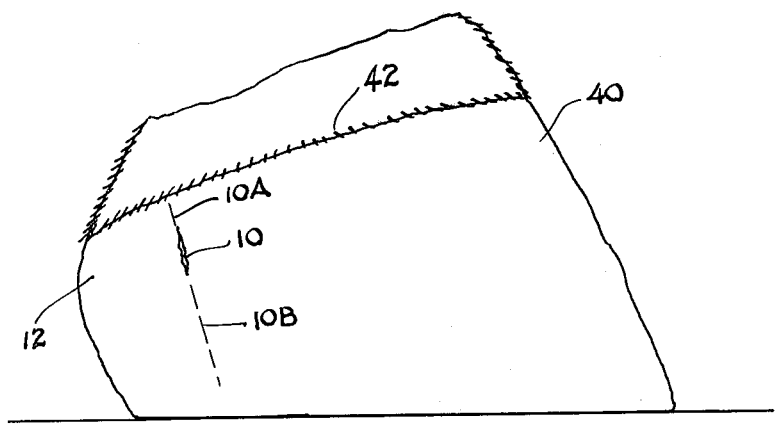
FIG. 1 shows a horse's hoof with a quartercrack.

FIG. 1 shows a horse's hoof with a crack 10, called a quartercrack, in the quarter 12 of the hoof. The quartercrack 10 may, indeed expand into the regions 10A and 10B.

The first step in repairing and strengthening the horse's hoof to immobilize the quarter 12 is to cut a substantially semi-circular hole 14 in the horse's hoof immediately behind the quartercrack 10. The edge of the hole is beveled at 16 to an exposed portion of the quick of the foot 18. The size, typically, of the quick or inner foot exposed at 18 is the size of a dime, i.e. about a diameter of ½ inch. The tissue then grows outward into the hole and over a portion 17 of the beveled edge 16 which is an extension of the quartercrack. The layers of the hoof are thereby locked in place. The lock is then reinforced.

Figure 3:
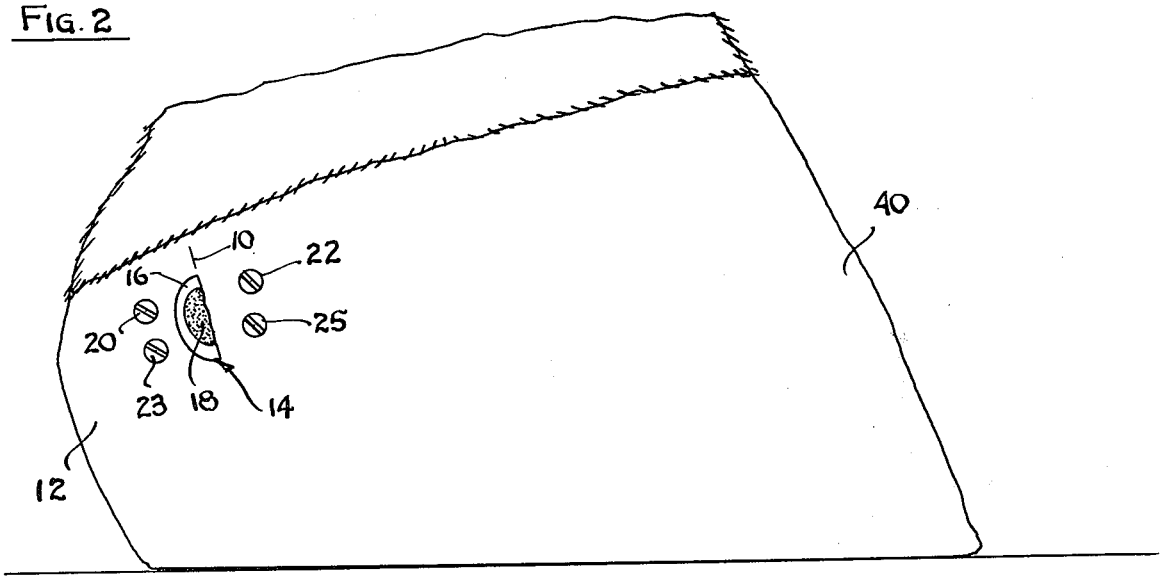
FIG. 3 shows four screw-anchors in the hoof of a horse, two on each side of a quartercrack, and the tissue growth exaggerated for clarity.

To reinforce the lock, at least two anchors are attached to the hoof on opposing sides of the quartercrack 10. The anchors, 20, 22, 23, 25 are shown in FIG. 3. The anchors 20, 23 are on the rearward portion of the hoof, and the anchors 22, 25 are forward of the quartercrack. The anchors 20 22, 23, 25 are, for example, simple wood screws or self-tapping screws which are screwed into the horse's hoof. Preferably the screws are No. 4 brass screws with a ⅜ inch length and a round head.

Preferably there are at least two pair of anchors as shown in FIG. 3 with anchors 22, 20 forming one pair of anchors and anchors 25, 23 forming another pair of anchors bridging the hole 14. If the quartercrack is longer, additional anchor pairs would be used.

The anchors of each pair of anchors 20, 22 are attached together by a tension member such as the line 30. The tension member 30 pulls the anchors 20, 22 toward each other.

Figure 4:
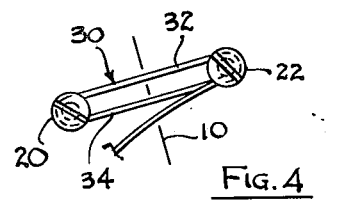
FIG. 4 shows the first step in positioning a line between a pair of anchors bridging a quartercrack.
Figure 5:
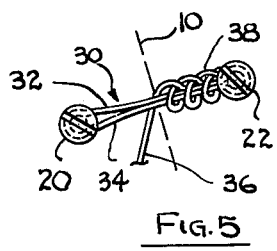
FIG. 5 shows a second step in tightening the lines of FIG. 4 using half hitches.
Figure 2:
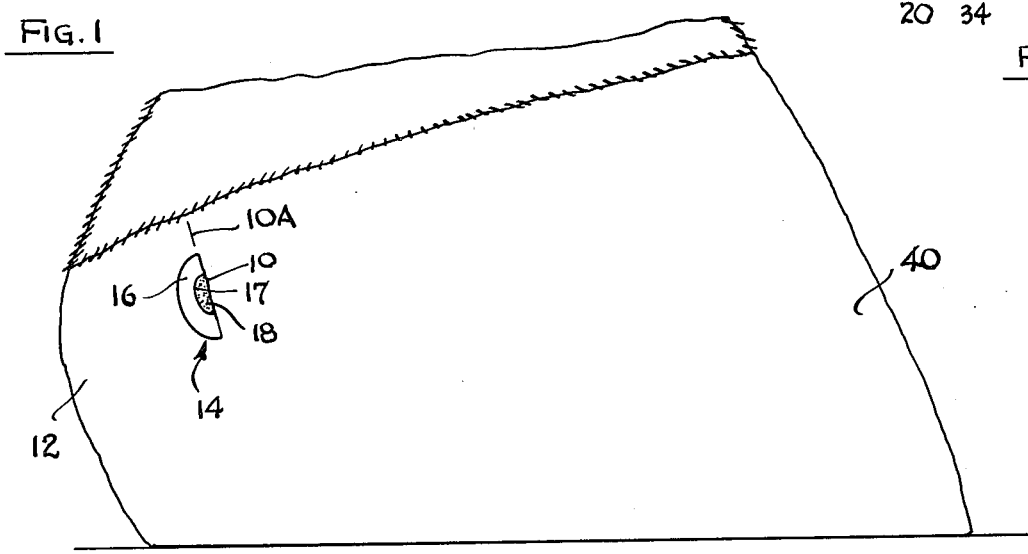
FIG. 2 shows a quartercrack with a substantially semi-circular cutout in accordance with this invention.

In the preferred embodiment of FIGS. 4 and 5, a line 30, such as a strong fishing line number 10, is attached by a slip knot to screw 20 and is then wrapped around the two anchors 20, 22 as shown in FIG. 5 (10 times) until two bunches or bundles of strands bridge the quartercrack 10. The end 36 of the line is then half hitched around the two bundles or strands 32, 34 as shown in FIG. 5 from one screw to the other. The wrapping 38 draws the two bundles 32, 36 together, thereby increasing the tension between the anchors 20, 22. Wrapping of the bundles 32, 34 also increases the strength of the connection.

Typically the spacing of each anchor pair 20, 22 is such that about 10 wrap-around turns 38 are needed to bridge the distance between the anchors.

After the anchor is complete, the exposed flesh 18 preferably is treated with medicine twice daily. Typically, ordinary horse corn medicine may be used to treat and harden the flesh 18.

Although the invention has been described in detail above, it is not intended that the invention shall be limited by that description, but only by that description taken in connection with the accompanying claims.

I claim:

1. The method of treating quartercracks in an animals hoof comprising: cutting a hole in the hoof adjacent one side of the crack to expose the quick tissue of the animals foot, beveling the hole in the loose portion of the hoof from the outer surface to the quick tissue, attaching at least one pair of anchors to said hoof at a point on each side of but spaced away a short distance from the crack and said hole, and placing a tension means between said anchors to permit said animal quick tissue to grow into, fill, and lock the crack together.

2. The method of claim 1 further comprising the step of placing the tensioning means by wrapping a segment of cord around and between said anchors to bridge the crack.

3. The method of claim 1 further comprising the step of attaching said anchors to the hoof by screwing two self-tapping screws on said each said side point into the hoof a distance to substantially penetrate into the hoof but not extend to the quick tissue.

4. The method of claim 2 further comprising the step of wrapping a plurality of cord tensioned segments around the anchors.

5. The method of claim 4 further comprising the step of half-hitching one end of the cord tightly around said plurality of cord segments to further tension them.

6. The method of claim 1 further comprising the step of applying corn medicine to the outer exposed surface of the quick tissue.

7. The method of claim 1 further comprising the step of placing several pairs of anchoring means and their tensioning means on each side of and bridging over the crack and hole.

* * * * *